Oct. 23, 1945. R. C. BLAYLOCK ET AL 2,387,492
HYDRAULICALLY OPERATED SPLIT FLAPS
Filed March 22, 1943 4 Sheets-Sheet 1
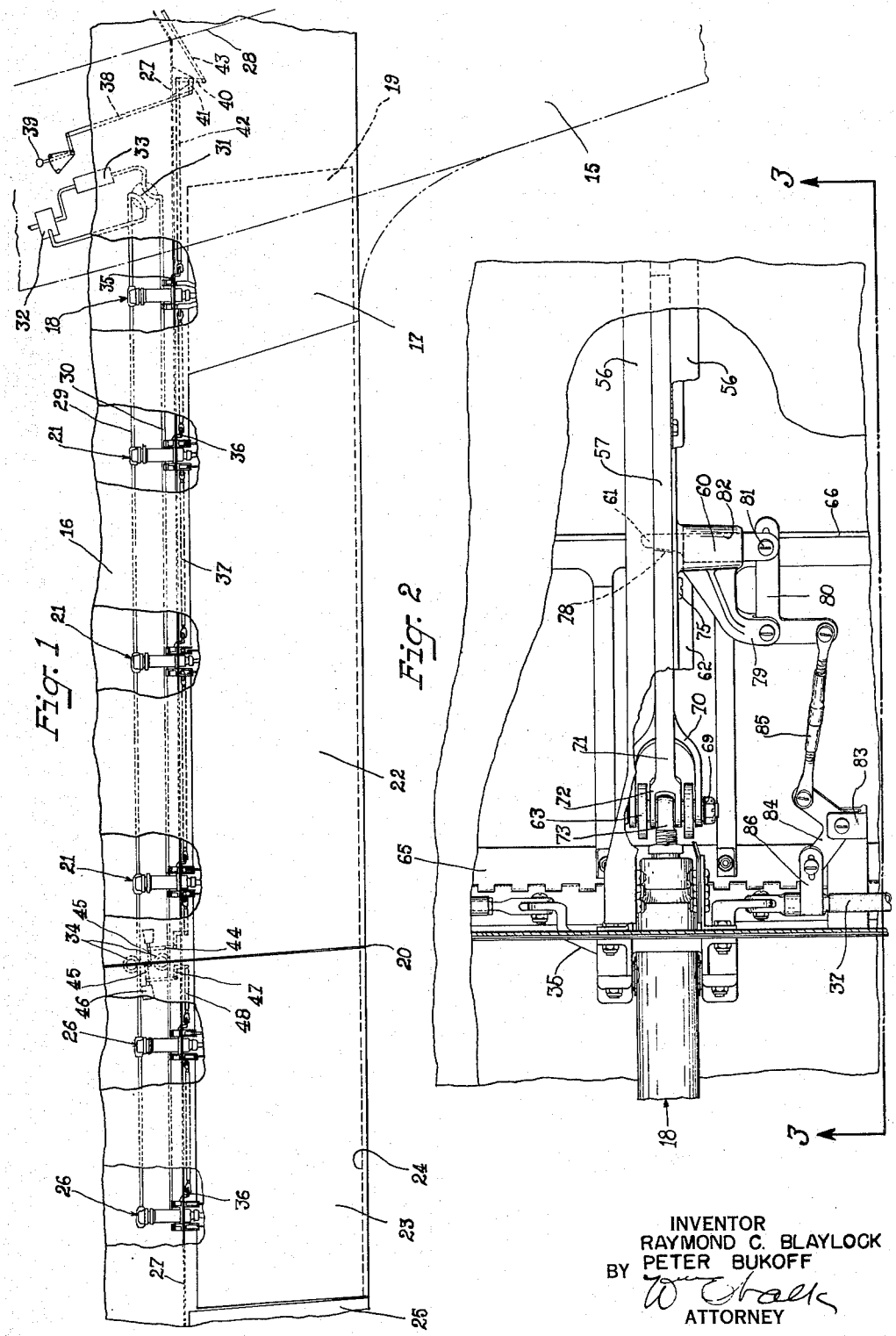
INVENTOR
RAYMOND C. BLAYLOCK
PETER BUKOFF
BY
ATTORNEY

INVENTOR
RAYMOND C. BLAYLOCK
BY PETER BUKOFF
ATTORNEY

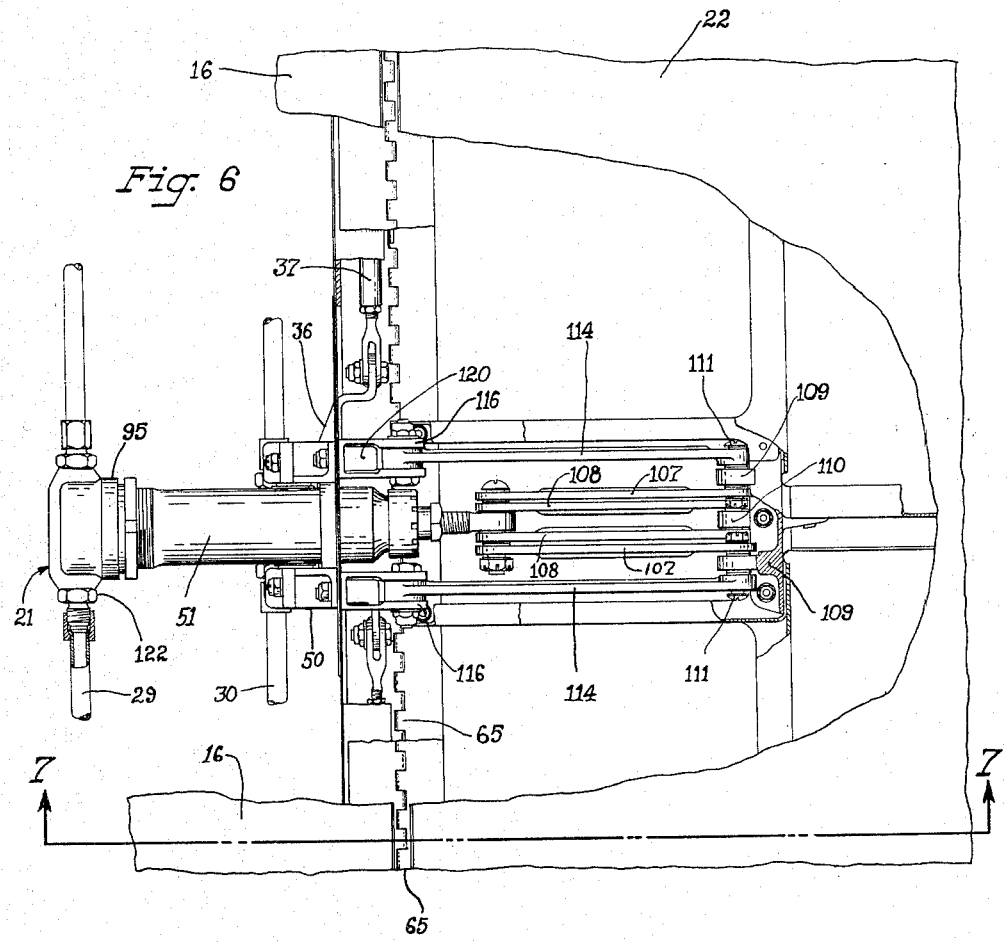
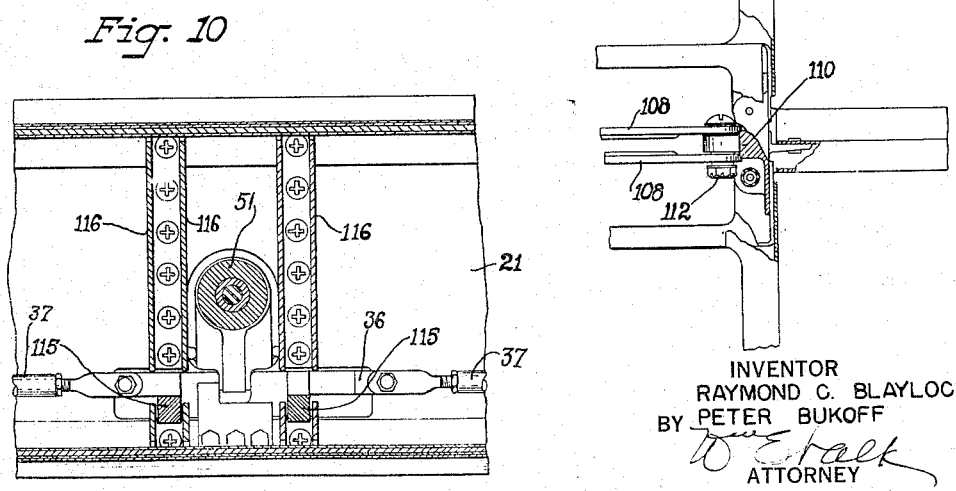

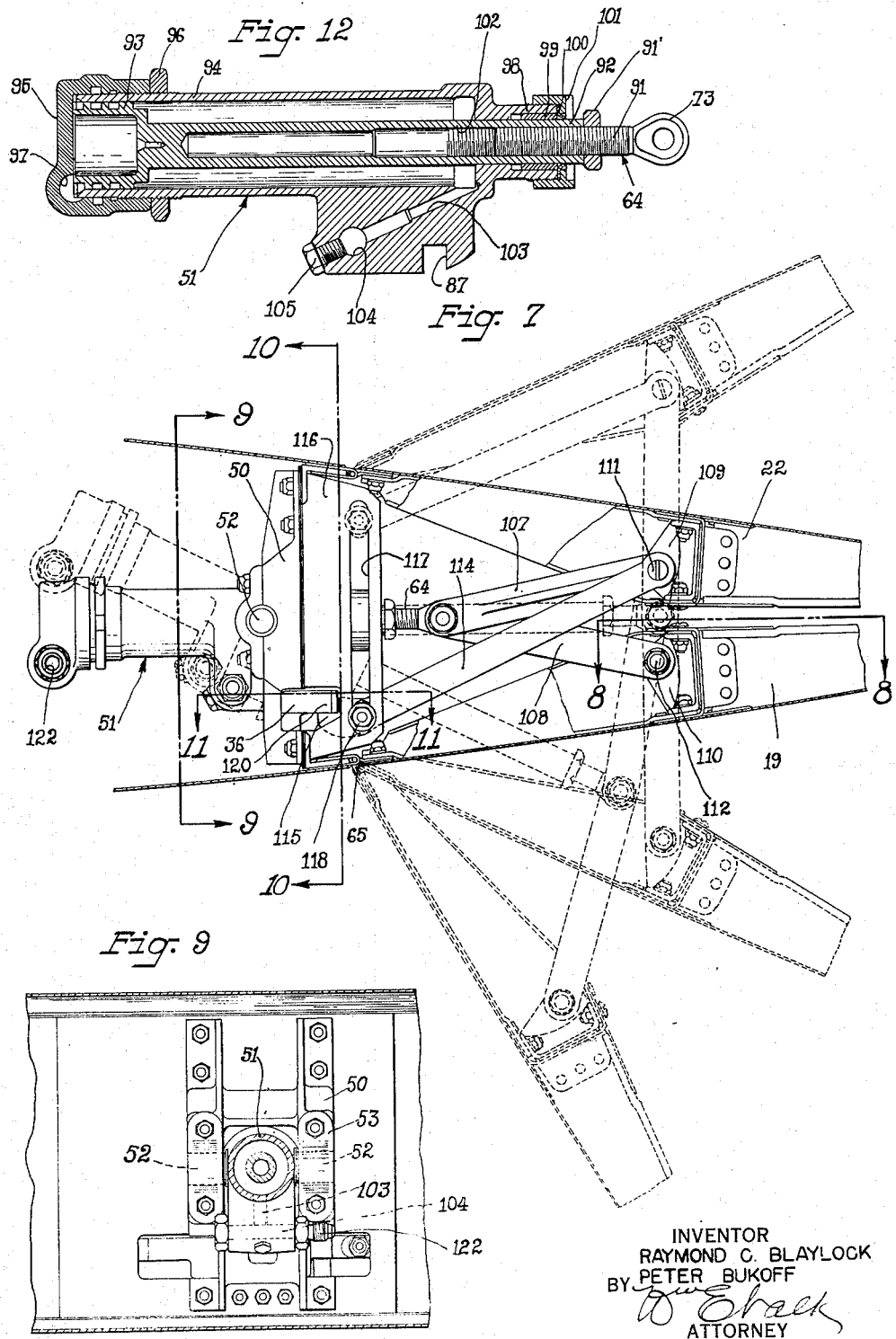
Oct. 23, 1945.  R. C. BLAYLOCK ET AL  2,387,492
HYDRAULICALLY OPERATED SPLIT FLAPS
Filed March 22, 1943  4 Sheets-Sheet 4
INVENTOR
RAYMOND C. BLAYLOCK
PETER BUKOFF
BY
ATTORNEY Patented Oct. 23, 1945

2,387,492

UNITED STATES PATENT OFFICE 2,387,492

HYDRAULICALLY OPERATED SPLIT FLAP

Raymond C. Blaylock, Bexley, and Peter Bukoff, Reynoldsburg, Ohio, assignors to Curtiss-Wright Corporation, a corporation of Delaware Application March 22, 1943, Serial No. 480,116

15 Claims. (Cl. 244—42)

This invention relates to airplane control mechanisms, and more particularly to power mechanisms for actuating split flaps.

Heretofore, actuating mechanisms used for opening and closing of flaps have been cumbersome, inefficient, and slow in operation. With each of the split flaps there has been required duplicate operating mechanisms and these mechanisms have generally been of a type utilizing a screw which, for the most part, is slow in operation and inefficient from an input-output point of view. In the use of the split flaps, in the act of dive bombing, it is highly essential that mechanism be provided wherein the flaps can be quickly closed at the end of the dive to readily allow the pilot to level off the plane. Screw mechanisms have been slow in their operation, requiring some times fifteen seconds to effect the closing of the flaps at the end of the dive. Further, such mechanisms have been self-locking and upon failure or destruction, during a dive, of the mechanism serving to operate the screws, the flaps remained locked in their open position and the pilot on coming out of the dive was left to control his plane in the best manner he could under the circumstances.

It is, therefore, one object of the present invention to provide an operating mechanism for split flaps which is light in weight, speedy in operation, and safe in its use.

It is another object of the invention to provide a mechanism for the operation of flaps which lends itself readily to the airplane of the folding wing type wherein there will be no need for a cumbersome and troublesome mechanism at the joint for the deliverance of power through the same.

It is still another object of the invention to provide, with a hydraulic mechanism, a linkage mechanism such that only a hydraulic actuator of minimum size be provided to operate the flaps and to retain the same in their open position.

According to the present invention, there has been provided a hydraulic system for the operation of the split flaps. This system includes a plurality of hydraulic actuators located inboard of the wing joint and outboard of the same wherein at the wing joint, power is transmitted hydraulically and through flexible conduits. These actuators serve to operate both of the flaps and when coupled with toggle link mechanisms, the same actuator serves to open the flaps simultaneously or singly as desired by the pilot. The pilot has at his control a selector mechanism whereby the actuator can be conditioned for the operation of the flaps simultaneously or for the operation of the lower flap singly. Connected between the two flaps and to the power actuator is a pair of toggle links. The actuator itself is, in turn, pivotally connected to the flap-carrying beam of the wing and can be locked in this position to give direct rearward thrust to the toggle link to effect the simultaneous opening of the flaps. The arrangement of the actuator and the links in this regard is such that the toggle will not be positively thrown over dead center position but will be retained just short of the same so that upon failure of the operating mechanism during a dive of the airplane, the flaps may be automatically closed by the wind pressure. The arrangement of the power actuator and the toggle links is also such that it can be used for lowering only the lower flap as is desired on take off and landing without the movement of the upper flap. The same mechanism serves for this operation, and further, the arrangement is peculiarly adapted for this use in that, upon pivotal movement of the actuator downwardly to effect this operation and the lowering of the toggle links, the toggle links will be automatically put in a position where they will be thrown to an over center position to serve to positively lock the flap in its down position. It is highly necessary for the landing of an airplane on an aircraft carrier that locking of the flap in its down position be assured and that any destruction of its power operating mechanism on landing of the airplane would not release these flaps.

For other objects and for a better understanding of the invention, reference may be had to the following detail description taken in connection with the accompanying drawings, in which Fig. 1 is a fragmentary plan view of portions of an airplane and particularly of the wing portion, its associated flaps, and the mechanism of the present invention for operating the flaps.

Fig. 2 is an enlarged plan view of the actuating mechanism located nearest to the fuselage and below the wing walk.

Fig. 6 is a fragmentary, enlarged plan view of the actuating mechanism such as used outboard of the actuating mechanism shown in Fig. 2, the same acting upon opposed flaps and not just upon the lower flap.

Fig. 7 is a view in elevation of this same actuating mechanism taken along the line 7—7 of Fig. 6 and looking in the direction of the arrows thereof.

Fig. 8 is a detail plan view, partly in section, of the connection of one of the toggle links with the lower flap and taken along line 8—8 of Fig. 7, and looking in the direction of the arrows thereof.

Fig. 9 is a detail fragmentary view looking at the front of the wing flap-carrying beam and at a section through a fluid actuator, the view being taken along the line 9—9 of Fig. 7 and looking in the direction of the arrows thereof.

Fig. 10 is a rear view of the flap-carrying beam with the actuator in section as viewed along the line 10—10 of Fig. 7 and looking in the direction of the arrows thereof.

Fig. 12 is a sectional view, in elevation, through the middle of the hydraulic actuator itself showing the fluid passages thereof and the location of the locking notch thereof.

Figure 3:
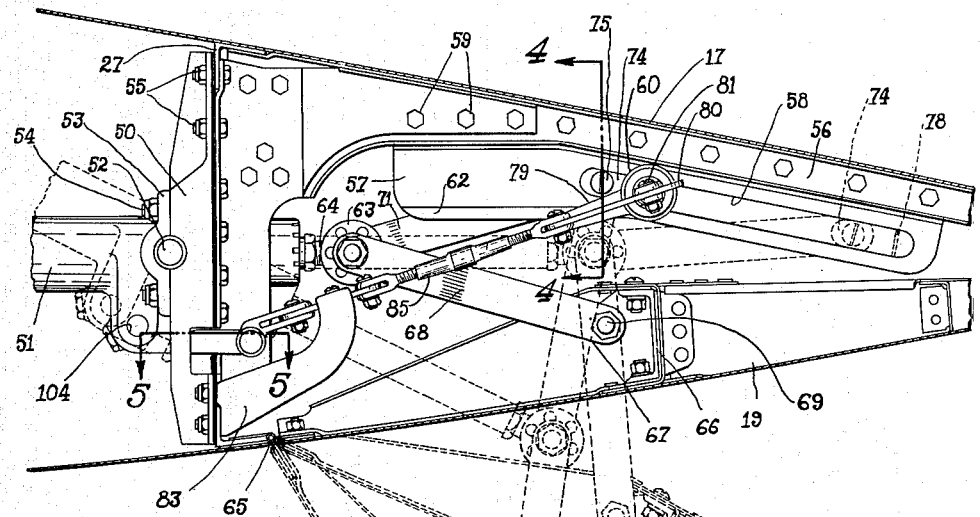
Fig. 3 is a view in elevation of this actuating mechanism and illustrating the positions of the power flap with respect to the wing walk, as taken on the line 3—3 of Fig. 2 and looking in the direction of the arrows thereof.

Referring now particularly to Fig. 1, there is shown in outline a fuselage 15 having an outwardly extending wing structure 16 connected thereto. The wing structure is properly faired into the fuselage and is provided with a wing walk 17 over which the pilot travels to enter the fuselage cockpit. Underneath this wing walk 17 is located a power actuating mechanism 18 serving to act upon lower wing flap 19 shown in dotted lines to extend inboard under the wing walk and under the fuselage. This lower flap 19 extends outboard to a wing joint 20 and is adapted to be actuated by power actuator mechanisms 21 located outboard of the actuator mechanism 18 and of the form such as shown in the Figs. 6 and 7. Immediately above the flap 19 and outwardly of the wing walk 17 is an upper flap 22 which, when used with the lower flap 19, serves to provide the split flaps used in dive bombing.

Beyond the wing joint 20 there is located a second pair of upper and lower flaps 23 and 24, the rearward edge of the lower flap being shown in dotted line to be forwardly of the rearward edge of the upper flap 23. Outwardly beyond this second pair of flaps is located an aileron 25. The flaps 23 and 24 are operated by power actuator mechanisms 26 of the same type as the power actuator mechanism 21 and as shown in the Figs. 6 and 7. All of the power actuator mechanisms 18, 21 and 26 are carried on a flap-carrying beam 27 extending from a center line 28 of the fuselage outwardly throughout the extent of the wing except for a break at the joint 20.

These power actuator mechanisms are of the hydraulic type, the actuators themselves being of the double acting fluid type of the cylinder and piston arrangement which receives and returns fluid through conduits 29 and 30 connected with a control valve 31 within the fuselage 15 and adapted to receive fluid under pressure from a fluid pump 32 driven by some auxiliary of the airplane and arranged to take the fluid or oil from a reservoir 33. All of the fluid actuators have fluid delivered to them at the same time, the same being connected for parallel operation whereupon the pairs of flaps will be operated in unison. At the wing joint 20 the fluid conduits 29 and 30 are coiled as indicated at 34 to allow for folding the wing surfaces. Heretofore with mechanical driving arrangements, complicated and cumbersome mechanism has been used to transmit power through the joint in order that the wings may be free to be folded without interference from the power drive mechanism. With the present invention this mechanism has been replaced by two flexible conduits.

Figures 5, 11:
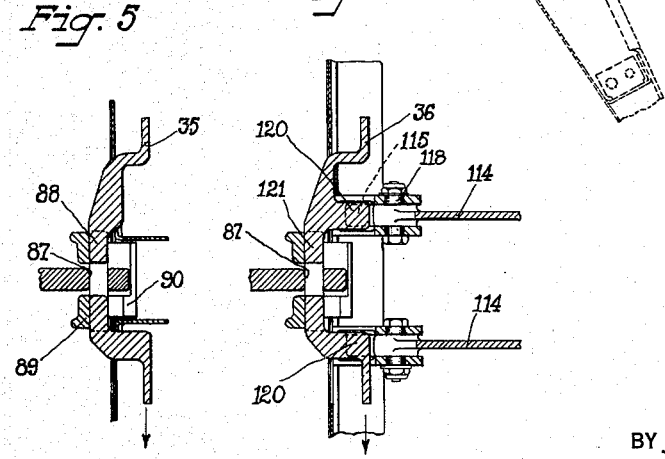
Fig. 5 is a view in section of the locking element for the selector mechanism and taken along the line 5—5 of Fig. 3 and looking in the direction of the arrows thereof.
Fig. 11 is a view in section of the selector locking mechanism for the form of actuating mechanism shown in Figs. 6 and 7 and taken along the line 11—11 of Fig. 7, looking in the direction of the arrows thereof.

Associated with each of the power actuator mechanisms is a locking element such as shown in detail in Figs. 5 and 11 and as indicated at 35 for the actuating mechanism 18 and at 36 for the actuating mechanisms 21 and 26. These locking elements are all interconnected by operating rods 37 and are adapted to be operated in unison by a manually operable mechanism 38 located in the fuselage and accessible to the operator. The mechanism 38 includes a hand lever 39 adapted to be moved from one position to the other to thereby selectively change the position of the lock elements 35 and 36. The mechanism 38 includes a lever 40 pivoted at 41 and connected with the locking element 35 of the actuating mechanism 18 by a link 42. The opposite end of the lever 40 is connected by a link 43 serving to connect with locking elements forming a part of the actuating mechanisms mounted on the right hand wing at the opposite side of the fuselage 15. At the wing joint a hinge mechanism 44 is provided for connecting together the mechanisms 21 and 26 adjacent to the joint. Due to the fact that continual power is not transmitted through such a mechanism 44, it can be of a more delicate and simple construction adding little to the weight of the airplane. The mechanism 44 can include elements 45 connected together at the folding line of the joint 20 and pivoted beneath the same to brackets 46 for jointwise pivotal movement and for connection through bell cranks 47 with links 48 connecting with the locking elements 36.

Referring now more particularly to Figs. 2 and 3, there is shown an enlarged view of the actuating mechanism 18 located beneath the wing walk 17. Since this mechanism does not function to act upon the upper flap, it necessarily has to be modified over the other mechanisms 21 and 26. To the flap beam 27 there is connected a trunnion bracket 50 in which is pivoted a fluid actuator 51 having trunnions 52 retained against the bracket 50 by a bearing clamping plate 53 and bolts 54, the bracket 50 being in turn secured to the flap beam by bolts 55. The wing walk 17 is supported by a rib structure 56 which carries a depending bracket 57 having a rearwardly extending slot 58 therein, the bracket 57 being secured to the rib 56 by means of bolts 59. Cast on the depending bracket 57 is a laterally extending bracket portion 60 adapted to house a locking pin 61 arranged to be in alignment with the slot 58 so that it may be thrust into the same. Along the lower edge of the depending bracket 57 are laterally extending flange portions 62 on the bottom face of which will ride respectively rollers 63 carried by a piston rod 64 of the fluid actuator 51. As the piston rod 64 is thrust forwardly, the rollers 63 may engage with the flanges 62 and be guided thereby.

Figure 4:
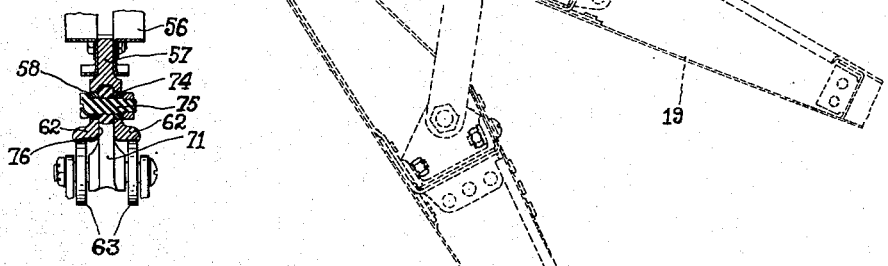
Fig. 4 is a detail view, in section, taken through the connection of one of the toggle links with the wing walk, as along the line 4—4 of Fig. 3 and looking in the direction of the arrows thereof.

The lower flap 19 extends laterally underneath the wing walk 17 and is pivoted to the flap beam 27 by a piano wire hinge 65. This flap 19 has a laterally extending beam 66 to which is connected a forwardly extending bracket 67. This bracket 67 serves as a means to which a lower toggle link 68 is pivotally connected to the flap beam as indicated at 69. This toggle link 68 is connected to the piston rod 64 as seen more clearly in Fig. 2, by means of a piston rod pin or bolt means 69. The link 68 is bifurcated at its upper end 70 through which the bolt 69 extends. Connected with the same bolt 69 is an upper toggle link 71 also bifurcated at its upper end 72 and it straddles the piston rod head 73. Intermediate adjacent bifurcations of the toggle links and carried by the same pin 69 are the guide rollers 63 above mentioned. The rearward end of the toggle link 71 is provided with guiding washers 74 and bolt means 75 for securing the washers 74 to the end of the link, Fig. 4. The link itself is arranged to be thrust upwardly into the rearwardly extending slot 76 in the depending bracket 57 with the guiding washers 74 located in the guiding slot 58 to ride therealong.

When the fluid actuator is retracted, the rearward end of the link 71 and its guide washers 74 will lie in the forward end of the slot 58. With locking pin 61 inserted into the slot 58, the link 71 will be thereby retained against rearward movement. As viewed in Fig. 2, it will be noted that the pin 61 is tapered off on one side and that the end of the link 71 is likewise tapered to match with the tapered surface of the pin 61. By this arrangement of tapered surfaces, the pin 61 is more readily and easily retracted. A tapered surface on the end of the link is indicated at 78 in Figs. 2 and 3.

Upon release of the pin 61 by means hereinafter described, and upon actuation of the fluid actuator 51 to extend the piston rod 64, the link 71 will be permitted to be moved bodily, rearwardly so that it assumes a position shown by the dotted lines in Fig. 3. The rollers 63 will have engaged the flanges 62 to thereby provide means against which the lower link 68 reacts to cause a downward movement of the lower end to effect partial opening of the lower flap 19, as when the flaps are opened simultaneously for use at times when the airplane is put into a dive.

Assuming that the pin 61 is left in its locking position and the fluid actuator 51 is permitted to rotate on its trunnion 52, a different movement of the lower flap 19 will be effected. Since the link 71 is retained against movement rearwardly, the toggle links will be straigthened so that the flap 19 will be moved to its full lowered position which is assumed when the lower flap is being used on take off and landing. It will be noted that the fluid actuator 51 will have been rotated to a dotted line position and that the rollers 63 will have left the guide flanges 62 of the bracket 57.

On the cast portion 60 of the depending bracket 57, there is a forwardly extending support 79 on which is pivoted a bell crank 80 having its end connected to the pin 61 as indicated at 81 to operate the pin 61 in and out of an opening 82 in the cast portion 60. Connected to the rear of the flap-carrying beam 27 is a rearwardly extending bracket 83 on which is pivoted a second bell crank 84. This bell crank 84 is connected with the bell crank 80 by an adjustable link 85. The bell crank 84 is also connected to a connecting portion 86 on an operating rod 87.

As viewed in Figs. 5 and 12, it will be noted that on the lower edge of the fluid actuator 51 there is a locking notch or abutment 87 adapted to cooperate with the locking element 35. This locking element 35, when moved in the direction of the arrow as viewed in Fig. 5 to a locking position, will have its portion 88 fitted in the notch 87 to thereby lock the fluid actuator 51 in its normal position to effect a direct rearward thrust upon the toggle links 68 and 71 and to slide the toggle link 71 along the slot 58. Simultaneously as this locking element 35 is moved in the direction of the arrow, the connecting portion 86 will likewise be moved, and through the connected linkage, comprising of bell crank 84, adjustable link 85, and bell crank 80, the locking pin 61 will be automatically withdrawn to free the upper end of the link 71. The locking element 35 is supported on shelf portions 89 and is retained in this position against fore and aft movement by a retaining plate 90 secured to the flap beam 27.

When it is desired to unlock the fluid actuator 51 to permit the same to be tilted downwardly for actuation of the lower flap 19 to its full lowered position, the locking element 35 is returned to the position shown in Fig. 5. This will release the fluid actuator, locking at the same time, the upper link 71 so that as the fluid actuator is extended, the toggle links will be pressed downwardly and fully extended. Whether the toggle links are thrown over center or not is dependent upon the adjustment of the piston rod 91 in the piston rod 92 of the fluid actuator. Preferably the adjustment is such that the toggle links are thrown rearwardly over dead center to positively lock the flap in its lowered position. While when the flaps are open for use in dive bombing, it is desirable that the toggle links be positioned just forward of the dead center position and left unlocked. It will be apparent that inasmuch as the toggle links are used, that a minimum size fluid actuator can be utilized since the load is retained through toggle action. It is only when the links are positioned just short of the dead center position that there is a strain on the fluid actuator, and, since this offset of the toggle links is slight, only a minimum size fluid actuator need be utilized to hold the flaps open.

As shown in Fig. 12, the fluid actuator 51 includes a piston portion 93 carried on the end of the hollow piston rod 92 and this piston and the piston rod are enclosed by a cylinder structure 94 in the lower edge of which is disposed the locking notch 87. On the forward end of the cylinder 94 is a cylinder head 95 adapted to receive fluid from the hose connections 29. This cylinder head 95 can be locked in any position on the cylinder by a locking nut 96 to vary the length of stroke of the fluid actuator, thus providing one other means of effecting delicate adjustment of the actuating mechanism. Fluid, on entering the cylinder head 95, is accumulated in a chamber 97 at the forwardmost end of the cylinder head. When the fluid actuators or the different actuating mechanisms are all supplied with fluid so that fluid pressure can be developed, the pistons 93 will be moved rearwardly, the hollow piston rod 92 sliding through a piston head formation 98 on the rearward part of the actuator 51. Provided in this head is a bushing 99 and a wiper 100, both of which are retained by a threaded cup member 101 screwed upon the head formation 98. Within the hollow piston rod 92, there is provided threaded formation 102 into which the threaded portion 91 of the piston rod 64 may be adjusted and retained by a locking nut 91'. Since the fluid actuator 51 is of the double acting type, passage way means 103 is provided in the cylinder 94 for delivering the fluid to the rearward end of the actuator. Fluid is delivered to this passage way forming transversely extending chamber 104 to the ends of which fluid conduits 30 can be respectively attached. To provide a drain for the rearward end of the cylinder 94, the passage way 103 is extended forwardly and threaded into the same is a bolt 105. Thus far, there has been described only the actuating mechanism 18 located beneath the wing walk 17. As of necessity, this actuating mechanism has been slightly different from the actuating mechanisms 21 and 26 to be now described.

Throughout this particular airplane, there are ten of these actuating mechanisms 21 and 26, and only two of the arrangements such as have been just described. However, any number of these actuating mechanisms may be used depending upon the design and size of the airplane. Thus referring now more particularly to Figs. 6 and 7, the form of the actuating mechanisms 21 and 26 when taken with the following description, will become more apparent. In this form, the locking mechanism for the links is entirely different and the upper link is connected directly to the upper flap to act upon the same. Connected between the flaps 19 and 22 are upper and lower toggle links 107 and 108. The outer ends of these links are connected to brackets 109 and 110 on the respective flap beams by bolt means 111 and 112. The connection is such that the links can pivot with respect to the flap beams.

Referring more particularly to Figs. 6 and 8, it will be noted that the toggle links are arranged in pairs, the pair of upper links are to straddle the pair of lower links 108. Bolt means 111 serves to connect the upper link 107 with the bracket 109 on the flap beam. This same bolt means 111 also connects to the flap beam of the upper flap a forwardly extending locking link 114 having a forward locking portion 115 on its forward end. There are two of these locking links 114, one at each side of the upper links 107.

Extending rearwardly from the flap-carrying beam 27 of the wing structure, there is located pairs of brackets 116 which have vertically extending slots 117. These pairs of projections 116 are located respectively at opposite sides of the fluid actuator 51. Provided on the forward ends of the links 114 are bolt and guide means 118 adapted to extend through the slots 117 to thereby guide the up and down movement of the links 114.

Referring now particularly to Fig. 11, it will be noted that the locking element 36 is of a slightly different variety than the locking element 35 of Fig. 5. The locking element 36 has portions 120 adapted to be aligned with the ends 115 of the locking links 114 to thereby prevent upward movement of the links 114 at such time when it is desired to move only the lower flap. It will be noted that while the end portions 115 are retained by the locking element 36, that the fluid actuator 51 is free to pivot downwardly, the notch thereof 87 being out of engagement with the locking element 36. Hence as the upper flap 22 is retained against upward movement by the locking links 114, the upper link 107 will drop downwardly with the forward end of the fluid actuator and the lower flap 19 will be forced to its lowermost portion to serve the airplane on take off and landing. It will be noted that in this position as shown in dotted lines that the toggle links 107 and 108 have been thrown rearwardly over the dead center position. Hence the flap will thereby be positively locked by means of the toggle links and any destruction of the fluid system will not unlock the flap, so that as the airplane is being landed on the ship, the pilot will be assured that the flaps will not fail him. Further movement of the links rearwardly over their dead center position is prevented by the abutment of the piston 93 against rearward cylinder head portion 98.

When it is desired to operate the flaps 19 and 22 simultaneously, the fluid actuator 51 is locked against downward pivotal movement by a portion 121 of the locking element 36. As the locking element 36 is moved in the direction of the arrow, the portion 121 will engage the notch 87. At the same time the formations 120 on the locking element 36 will leave the forward projections 115, thereby releasing the locking links 114 to permit the same to slide upwardly in the slots 117. As the fluid actuator is then extended, the links 107 and 108 will move equally upwardly and downwardly so that the flaps are moved in a position such as used when the airplane is in a dive. The action of the fluid actuator is swift and these positions can be readily assumed. The links 107 and 108 are thrust rearwardly to a point just short of the over center position and there retained by the fluid in the fluid actuator 51. The locking links 114 will slide upwardly and out of the way.

It should now be apparent that there has been provided an automatic arrangement whereby the lower flaps can be positively locked by toggle links in a lowered position and wherein the toggle links fall just short of the dead center position when they are thrust rearwardly to act upon both flaps simultaneously. It should thus be apparent that with the arrangement, only a minimum size fluid actuator need be provided, thereby greatly reducing the weight which might otherwise be necessary for an arrangement not utilizing the toggle links. It should also be apparent that the fluid actuator serves to operate upon both of the flaps and that separate actuators are not necessary as with the more common screw type of actuating mechanisms.

Referring now particularly to Fig. 1, it should be more clear that the fluid actuators 51 are supplied with fluid from a common source and that the forward and rearward cylinder heads are respectively connected to a common source whereby the actuators are simultaneously supplied with the fluid. Referring particularly to Fig. 9, it will be noted that coupling arrangements are provided on the fluid actuator device to which the hose couplings are connected. These connections may include a thimble 122.

While various changes may be made in the detail construction, it shall be understood that such changes shall be made within the spirit and scope of the present invention as defined by the appended claims.

We claim as our invention:

1. In an airplane control mechanism, a stationary surface, split movable control surfaces connected to the stationary surface to open in opposite directions, power means for opening and closing said control surfaces simultaneously, said power means including toggle links connecting the two control surfaces, and means for locking one of the toggle links against movement to retain its control surface, and to cause movement of the links in such a manner as to effect opening of the opposite control surface only.

2. In an airplane control mechanism, a wing structure, split flaps connected to the wing structure to open in opposite directions, power means for opening and closing said flaps simultaneously, said power means including toggle links connecting the two flaps, and means for locking one of the toggle links against movement to keep its flap closed and to force movement of the links in such a manner as to effect opening of the opposite flap only.

3. In an airplane control mechanism, a stationary structure, a pair of movable control surfaces connected to the stationary structure for movement with respect thereto, a power actuator, means pivotally connecting said power actuator to the body structure, toggle links connecting the control surfaces and being connected to the power actuator to be operated by the latter, and selective means for locking either the power actuator against pivotal movement to cause simultaneous operation of the control surfaces or to release the power actuator and lock one of the surfaces against movement to cause actuation of the other surface only.

4. In an airplane control mechanism, a stationary structure, a pair of movable control surfaces arranged in opposing relationship with respect to each other and connected to the stationary structure, a power actuator adjustably connected to the stationary structure, toggle links connected between the movable control surfaces and to the power actuator, the said power actuator adapted to be extended a predetermined amount which is just short of dead center of the links when the surfaces are simultaneously opened, means for locking one of the surfaces against movement, the toggle links and the power actuator being arranged so that as the other of the surfaces by itself is moved the toggle links are thrown over dead center position to thereby retain the surface in its open position.

5. In an airplane control mechanism, a wing structure having a flap-carrying beam, split flaps connected to the flap beam for pivotal movement with respect thereto, a plurality of fluid actuating mechanisms spaced apart along the wing structure, each of which includes a double-acting fluid power actuator which is pivotally connected to the flap beam, toggle links connected between the flaps and to the power actuator, means for locking the power actuator against pivotal movement, means for locking one of the toggle links against a certain defined movement to prevent movement of one of the flaps, and means for selectively conditioning the locking means for both the actuator and the one toggle link whereby the flaps may be operated either simultaneously or singly, a fluid pressure source, and said fluid actuating mechanisms connected with the fluid source for parallel operation.

6. In an airplane control mechanism, a wing structure having a flap-carrying beam, split flaps connected to the wing structure for movement with respect thereto, a fluid actuating mechanism for simultaneously moving the flaps, said fluid actuating mechanism including a fluid actuator connected to the flap-carrying beam for pivotal adjustment and toggle links for connecting the fluid actuator to the flaps, means for locking one of the flaps against movement including means on the flap-carrying beam for providing a vertically extending slot, a locking link connected between the slot and flap to be locked, said locking link adapted to be retained in one position in the slot to lock the flap, means providing an abutment on the fluid actuator, and selective locking means laterally slidable on the flap-carrying beam and adapted to engage either the abutment on the fluid actuator or the locking link to retain the end of the link in the one position in the slot.

7. In an airplane control mechanism, a wing structure, a pair of cooperating control surfaces pivotally connected to said wing structure for movement to open and closed positions, toggle mechanism connecting said control surfaces, means for actuating said toggle mechanism to operate said control surfaces simultaneously, and means for locking one of said control surfaces in its closed position, whereby said actuating means and toggle mechanism will be operative to actuate the other only of said control surfaces.

8. In an airplane control mechanism, a wing structure, a pair of cooperating control surfaces pivotally connected to said wing structure for movement to open and closed positions, toggle mechanism connecting said control surfaces, and means for actuating said toggle mechanism to operate said control surfaces simultaneously or to operate one only, said actuating means limiting movement of said toggle mechanism short of dead center when said control surfaces are actuated simultaneously but permitting said toggle mechanism to pass dead center when one only of said control surfaces is actuated.

9. In an airplane control mechanism, a wing structure, a pair of cooperating control surfaces pivotally connected to said wing structure for movement to open and closed positions, toggle mechanism connecting said control surfaces, means for actuating said toggle mechanism to operate said control surfaces simultaneously, and means for locking one of said control surfaces in its closed position, whereby said actuating means and toggle mechanism will be operative to actuate the other only of said control surfaces, said actuating means limiting movement of said toggle mechanism short of dead center when said control surfaces are actuated simultaneously but permitting said toggle mechanism to pass dead center when one only of said control surfaces is actuated.

10. In an airplane control mechanism, a wing structure, a pair of cooperating control surfaces pivotally connected to said wing structure for movement to open and closed positions, toggle links connnecting said control surfaces, means for actuating said links to operate said control surfaces simultaneously, and means for locking one of said toggle links against movement in a position in which it holds one of said control surfaces closed, whereby said actuating means and toggle links will be operative to move the other only of said control surfaces.

11. In an airplane control mechanism, a wing structure, a pair of cooperating control surfaces pivotally connected to said wing structure for movement to open and closed positions, toggle links connecting said control surfaces, means for actuating said links to operate said control surfaces simultaneously, and means for locking one of said toggle links against movement in a position in which it holds one of said control surfaces closed, whereby said actuating means and toggle links will be operative to move the other only of said control surfaces, said actuating means limiting movement of said toggle links short of dead center when said control surfaces are actuated simultaneously but permitting said toggle links to pass dead center when one only of said control surfaces is actuated.

12. In an airplane control mechanism, a wing structure, a pair of cooperating control surfaces pivotally connected to said wing structure for movement to open and closed positions, toggle links connecting said control surfaces, means for actuating said toggle links to operate said control surfaces simultaneously, a link having a connection with one of said control surfaces and a lost motion connection with the wing structure, means for actuating said toggle links to operate said control surfaces simultaneously, and means for preventing lost motion between said link and said structure in a position in which said link holds closed the control surface to which it is connected, whereby said actuating means and toggle links will be operative to move the other only of said control surfaces.

13. In an airplane control mechanism, a wing structure, a pair of cooperating control surfaces pivotally connected to said wing structure for movement to open and closed positions, toggle links connecting said control surfaces, means for actuating said toggle links to operate said control surfaces simultaneously, a link having a connection with one of said control surfaces and a lost motion connection with the wing structure, means for actuating said toggle links to operate said control surfaces simultaneously, and means for preventing lost motion between said link and said structure in a position in which said link holds closed the control surface to which it is connected, whereby said actuating means and toggle links will be operative to move the other only of said control surfaces, said actuating means limiting movement of said toggle links short of dead center when said control surfaces are actuated simultaneously but permitting said toggle links to pass dead center when one only of said control surfaces is actuated.

14. In an airplane control mechanism, a wing structure, a pair of cooperating control surfaces pivotally connected to said wing structure for movement to open and closed positions, toggle link mechanism connecting said control surfaces, a power actuator connected to said link mechanism, means for pivotally connecting said power actuator to said wing structure, and means for locking one of said control surfaces against movement in its closed position, whereby said power actuator and said link mechanism will be operative to actuate the other only of said control surfaces, said power actuator swinging about said first mentioned means as this occurs.

15. In an airplane control mechanism, a wing structure, a pair of cooperating control surfaces pivotally connected to said wing structure for movement to open and closed positions, toggle link mechanism connecting said control surfaces, a power actuator connected to said link mechanism, means for pivotally connecting said power actuator to said wing structure, and means for locking either said power actuator against pivotal movement to cause simultaneous operation of said control surfaces or to release said power actuator while locking one of said control surfaces closed and thereby cause actuation of the other control surface only, said power actuator swinging about said first mentioned means when said last mentioned control surface only is actuated.

RAYMOND C. BLAYLOCK.
PETER BUKOFF.